June 14, 1927. 1,632,619
E. M. MORLEY
TIRE INFLATION MECHANISM
Filed May 2, 1925    2 Sheets-Sheet 1
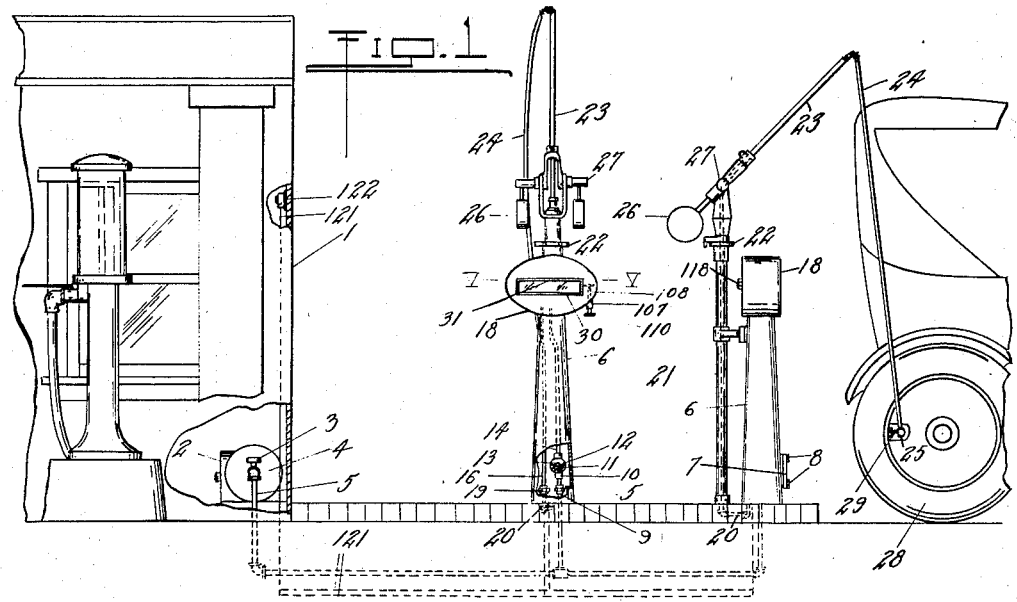
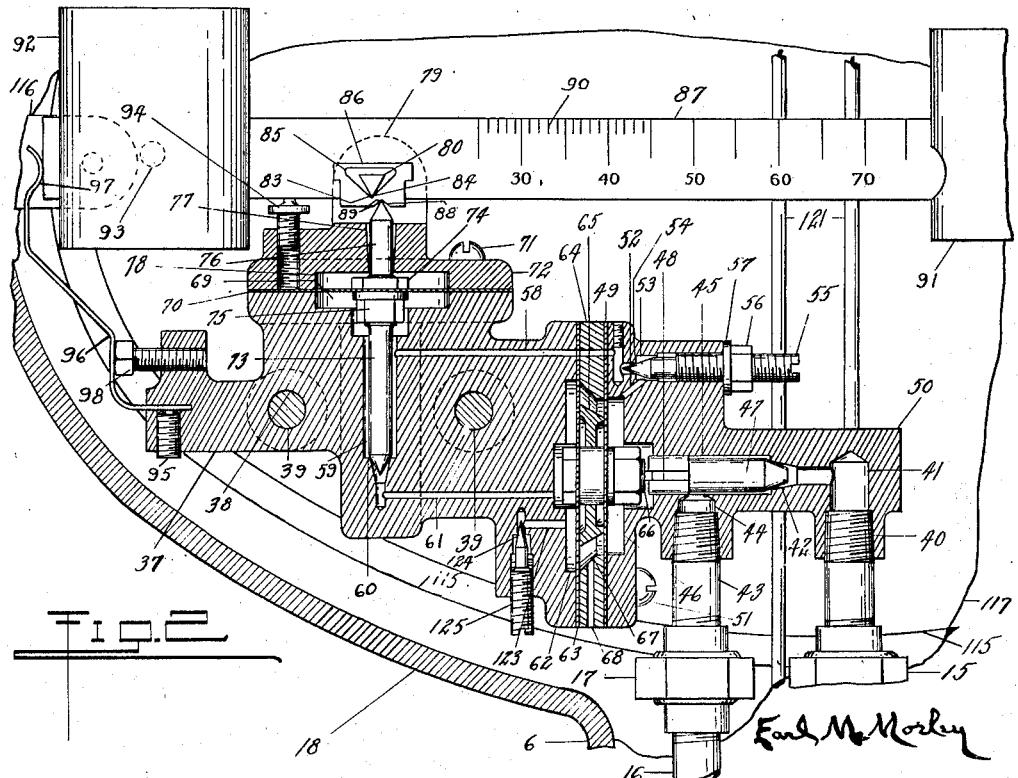
Earl M. Morley
INVENTOR
Geo E Kirk
BY
ATTORNEY.

June 14, 1927.
E. M. MORLEY
1,632,619
TIRE INFLATION MECHANISM
Filed May 2, 1925
2 Sheets-Sheet 2
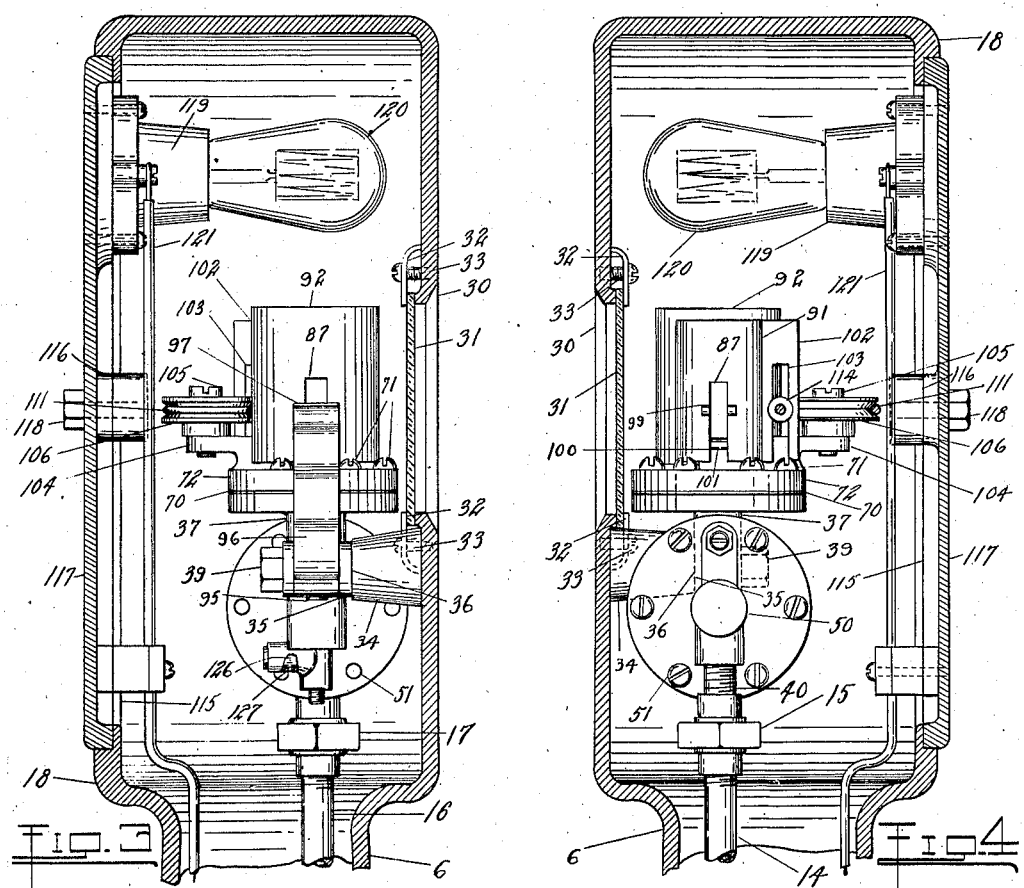
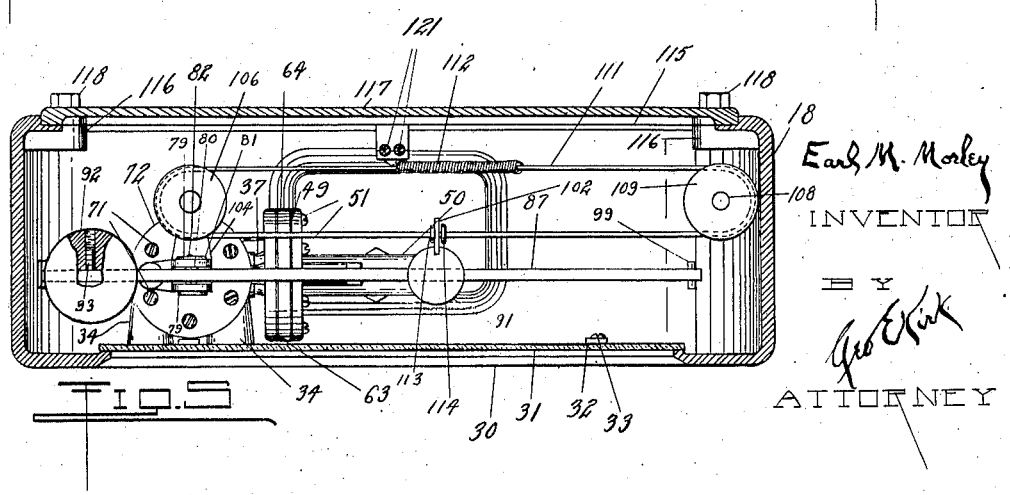
Earl M. Morley
INVENTOR
BY
Geo E Kirk
ATTORNEY Patented June 14, 1927.

1,632,619

UNITED STATES PATENT OFFICE.

EARL M. MORLEY, OF DELTA, OHIO, ASSIGNOR TO THE AIR-SCALE COMPANY, OF TOLEDO, OHIO, A CORPORATION OF OHIO.

TIRE-INFLATION MECHANISM.

Application filed May 2, 1925. Serial No. 27,414.

This invention relates to fluid delivery.

This invention has utility when incorporated for cutting off valve control, especially for the delivery of fluid as in the supplying of air to pneumatic tires to a preselected pressure.

Referring to the drawings:

Fig. 1 is a view of an installation embodying the invention;

Fig. 2 is an enlarged view in front elevation, with parts broken away;

Fig. 3 is an end view of the control unit from the left of Fig. 2, the housing being in section;

Fig. 4 is an end view of the control unit from the right of Fig. 2, parts being broken away, the housing being in section; and Fig. 5 is a section on the line V—V, Fig. 1.

Filling station 1 is shown as having electric motor 2 controlled by regulator valve 3 for maintaining pressure in air reservoir 4, as an air supply. From this air supply 4 extends line 5.

Herein, there is provided standard or tower 6 having front plate 7 removably mounted by bolts 8 to give access to this hollow column 6. Upwardly extending in this hollow column 6 is this supply line 5 for air under pressure connected by union 9 with fitting 10 having screen 11 for entraining particles of foreign matter. Opening 12, to this fitting 10, is provided with closure 13 which may be readily removed for taking out this clean-out screen 11, and thereby clearing up foreign matter from the air pressure supply reservoir 4.

Upwardly extending in this hollow column or standard 6 from this clean-out fitting 10 is supply pipe 14 extending to union 15. In this hollow column 6 adjacent this supply pipe or duct 14, is delivery duct 16 extending downwardly from union 17 adjacent enlargement or housing 18 as mounted on the column 6. In the region of the plate 7, this column 6 has therein union 19, connecting the delivery duct 16 with an extension 20 therefrom. This duct 20 is shown as extending upwardly in column 21, herein shown as adjacent the standard or column 6. This column 21 has this delivery duct extension 20 protrude from the top thereof adjacent head 22 and there connected to arm 23 upon which is mounted flexible hose extension 24 terminating in check valve 25. The arm 23 is a retrieving arm normally maintained upright by counterweight 26 swinging on pivot bearing 27 carried by the head 22.

In charging pneumatic tire 28 having valve stem 29, the check valve terminus 25 of the flexible extension 24 of the delivery duct may be pressed into seating position over this valve stem 29 to uncheck the valve therein to thus permit the pressure air to flow to the tire to be inflated.

Housing 18 is provided with front opening 30 in which is transparency 31, as a window, held in position by flanges 32 mounted by bolts 33. Below this window 31, this housing has a pair of bosses 34 providing seats 35 disposed in position to abut seats 36 of valve frame 37 having openings 38 therethrough to be engaged by bolts 39 in mounting this valve frame 37, and its assembled control mechanism as a unit in this housing 18. This automatic control adjustable valve unit is accordingly a simple device which may be readily installed and removed from the housing 18. This is a factor of value in replacement and up-keep.

With this valve frame 37 anchored by these bolts 39, in position in the housing 18, union 15 may be connected by nipple 40 with supply duct passage 41 extending to needle valve seat 42 in this valve frame 37. With this air supply connection adjacent thereto, the union 17 may be connected by nipple 43 with delivery duct 44 from way 45 to port chamber 46 in this valve frame 37. This unit is, accordingly, fully assembled and in the housing 18.

Disposed for coacting with the seat 42 is primary valve plunger 47, as a needle valve member having clearance as to way 45, and sustained for guiding as to said way 45 into the valve seat 42 by wings 48. This plunger 47 is of clearance for air flow as to the passage 45, to the chamber 46 and is directly connected to diaphragm 49. This diaphragm 49 is mounted between main valve frame 37 and valve frame extension 50, and, accordingly, this extension 50 of the valve frame 37 provides the primary valve chamber 46. Bolts 51 assemble this extension 50 with the frame 37.

From the chamber 46 extends duct 52 to chamber 53 having outlet port seat 54 controlled by adjustable needle valve 55 locked in adjusted position by nut 56, against gasket 57. This port 54 at the adjusted clearance of the needle valve 55 is in communication by way 58 with secondary way 59 having port 60 in communication with way 61 to secondary chamber 62 at diaphragm 63 spaced by plate 64 between the frame 37 and the frame extension 50 from the diaphragm 49.

Between the diaphragm 49 and the diaphragm 63 is spacer 65 with bolt 66 anchoring such spacer 65 with the diaphragms 49, 63, and the plunger 47. The exposed area of the diaphragm 49 in the primary chamber 46 is less than the exposed area of the parallel diaphragm 63 in the secondary chamber 62. Accordingly, there is provided herein, differential diaphragm means effective as pressure builds up in the secondary chamber 62 to approach the pressure in the chamber 46 for flexing the diaphragms 49, 63, to thereby thrust the plunger 47 along the way 45 into closure position as to the seat 42 in effectually cutting off by this needle valve inflow of air. The flexing of the diaphragms 63, 49, may freely occur independently of temperature disturbance for chamber 67 between these diaphragms has port 68 therethrough.

The secondary way 59 is in direct communication with chamber 69 having diaphragm 70 as a side thereof. Bolts 71 assemble frame extension 72 with the frame 37 for fixedly mounting this diaphragm 70 with the frame 37. Fixed with this diaphragm 70 is secondary valve plunger 73, as a needle valve, coacting to control port 60 from this secondary way 59. This plunger 73 as assembled by nuts 74, 75, into fixed position with the diaphragm 70, has stem 76 extending therefrom loosely from guide way 77 from chamber 78 in the extension 72. Accordingly, any shifting of the stem 76 is coincident with the shifting of the plunger 73 for opening or closing port 60.

The extension 72 is provided with a pair of ears 79 in which is mounted triangular member 80 having front plate 81 fixed by bolt 82, with one of the ears 79. This triangular member 80 has knife edge bearing 83, as its lower angle, thus providing a bearing coacting with opposing knife edge seat 84 of recess 85 in plate 86 carried by lever 87. This lever 87 adjacent the seat 84 and oppositely directed, has seat 88 with which coacts knife edge terminus 89 of the stem 76.

This lever 87 is provided with graduations 90, herein shown as in pounds avoirdupois, over a portion thereof providing a slide or guide way. On this guide way is mounted indicator weight 91, as an adjustable weight or loading for this long arm of the lever 87.

Remotely from the indicating portion of the lever 87, there is mounted counterweight 92 adjustably held by set screw 93 for regulating the sensitiveness in the operation of this lever 87. Adjusting screw 94 in the frame extension 72 provides an adjustable abutment determining the rocking limit of the indication portion 90 of the lever 87 upward. Set screw 95 in the frame 37 anchors spring 96 having yieldable terminus 97, the retarding action of which on the end of the lever 87 may be adjusted by set screw 98. The ears 79 determine the inward limit of travel for the weight 91, while pin 99 near the end of the lever 87, remote from the counterweight 32, precludes shifting of this indicator weight 91 off the graduation portions 90 of the arm of the lever 87.

This indicator weight 91 is provided with slot 100 so that this weight 91 may be astride the lever 87. Pin 101, through this indicator 91, below the arm, serves to prevent this indicator from being lifted off the arm or being jarred out of place.

This indicator weight 91 has rearwardly therefrom a fin 102 having slot 103 as a seat. Frame extension 72 has rearwardly therefrom ear 104 mounting bearing stud 105 for guide pulley 106. The frame 18, has, remote from this ear 104, boss 107 for rotatively carrying stem 108 for companion driving pulley 109. Knurled head or handle 110 outside the housing 18, as an exterior accessible means, is effective as mounted on the stem 108 for rotating the pulley 109. About these pulleys 106, 109, extends cable 111 having on the reach thereof, parallel to and more remotely in the rear of the lever 87, yieldable take-up section 112. On the portion of reach of this cable 111, in proximity to the lever 87, is a pair of lugs 113, 114, providing a flight engaging the fin 102 as the cable 111 may freely slide through the slot 103.

The after portion of this housing 18 has opening 115 with bosses 116. Back closure plate 117 may accordingly be mounted in position by bolts 118 in completing the housing assembly of this regulator valve unit in this tire inflation mechanism installation. This rear closure plate 117 is shown as carrying socket 119 for incandescent bulb 120 having electric conductor lines 121 thereto upward through the column 6 so that as switch 122 at the filling station 1 is turned on there may be illumination within the housing 18 shining through the window 31 for lighting up the graduations 90 or scale beam analogy so that the one desiring to use this installation may readily determine which way to turn the knob 110 to bring the indicator 91 to the desired position on the graduations 90 of the lever 87. When this adjustment has taken place, the one desiring to inflate a tire, or otherwise use the air, takes the duct or hose 24, swings it into position on the valve stem as clear of its cap, and effects releasing of the check 29 so that flow of air may occur. This flow of air does at once take place if the pressure or air in the tire 28 be less than the indication on the graduations 90 as selected by the indicator 91. As the pressure is released, the positioned weight or indicator 91 tends to bring the lever 87 into lowered position. Construing the indicator 91 as the load, the knife edge bearing 89 of the stem 76 as the power, and the knife edge bearing 83 as a fulcrum, this is a lever of the third class. The needle valve 73, 60 is closed. The release of air in the line, and thus the lowering of pressure in the chamber 46 tends to allow the supply of air past the needle valve 42 to charge the tire. In this flow of air, there is, according to the adjustment of the needle valve 55, a seepage of air by way of the duct 58. This flow of air into the tire or other chamber being charged continues for an interval until the adjusted seepage past the needle valve 54, 55, effects such accumulation in the chamber 69 that the needle valve 60, 73, is opened. At once, there is a slight rocking of the lever 87 with action in the secondary chamber 62 for closing the valve 47, 42. This is a pulsation in the control of the apparatus adjusted herein not only by the needle valve 54, 55, but by adjustable leakage from the secondary chamber 62. This is by way of duct or way 123 to port 124 as controlled by needle valve 125 with air flow to chamber 126 as a muffler having discharge opening 127. With the leakage at this muffler more than the capacity of flow past the needle valve 54, 55, the chamber 62, according to the relative timing between the valve 54, 55, and the valve 124, 125, so lowers the pressure in the secondary chamber 62 that the air supply pressure in the primary chamber 46 unseats the valve 42, 47, as a second pulsation, as the diaphragm 70 has closed the valve 73, 60. As a succeeding pulsation, flow of air past the valve 54, 55, again builds up the pressure in the chamber 69, and by opening port 60 builds up pressure in the chamber 62. These pulsations effect rocking of the lever 87 in a timed relation which may be most nicely controlled. This is an automatic check of this regulator valve upon itself for a nicety of pressure delivery adjustment and permits a degree of accuracy for pre-selected delivery pressures independently of a wide range of higher pressure in the primary supply reservoir 4. The leakage spill as at the muffler 126 is insignificant and as herein used is cooperative for the control of the device.

In so far as this disclosure relates to common subject matter with my former copending application S. N. 691,419, filed February 8, 1924, such is a continuation in part thereof.

What is claimed and it is desired to secure by United States Letters Patent is:

1. A primary valve housing having a port, a plunger movable in said housing for opening and closing said port, a diaphragm coacting with the plunger for actuating the plunger, said diaphragm defining a port chamber on one side thereof and a second chamber on the other side thereof, there being a passage between said chambers, a secondary valve in said passage, and a muffled leakage for said second chamber.

2. A tire inflation apparatus including a supply valve, a pressure line port closed by said supply valve, a control valve cut off from communication with the supply line when said supply valve is closed, a control arm for the control valve, adjustable loading means for the arm mounted on the arm and movable therealong, a housing for the arm, means mounted independently of arm oscillation for adjusting said loading means, and additional yieldable means frictionally coacting with the arm to resist free swinging thereof.

3. A pulsating air delivery valve for tire inflation, a housing for the valve, an arm in said housing providing a way, a fixed fulcrum for the arm, an indicator having a notch movable along said way, a valve controlling plunger engaging the arm between the fulcrum and indicator for oscillating the arm during air delivery up to a predetermined maximum tire pressure, a cable having a flight for engaging said notch, vertical axis pulleys mounted independently of the arm and supporting said cable to provide a reach thereof extending along said arm, and a knob exterior of the housing coaxial with one of said pulleys for actuating such pulley.

4. A valve housing having supply and discharge ducts and a port therebetween, a plunger reciprocable for effecting delivery pulsations through said port, a directly connected double diaphragm coacting with the plunger for actuating the plunger, said diaphragm defining a port chamber on one side thereof, there being a passage between the chambers having above atmospheric pressure maintained therein, said port as closed by the plunger isolating the double diaphragm from said supply duct, and a manual control in the passage for said diaphragm effective to control the timing of the diaphragm pulsations.

5. A primary valve housing having a port, a plunger reciprocable for effecting delivery pulsations through said port, a double diaphragm coacting with the plunger for actuating the plunger, said diaphragm defining a port chamber on one side thereof and a second chamber on the other side thereof, there being a passage between said chambers having above atmospheric pressure maintained therein, a secondary valve in said passage to be seated by pressure supplied through said passage, and a controllable leakage for said second chamber timing counterpoise pressure fluctuations for plunger pulsations.

In witness whereof I affix my signature.

EARL M. MORLEY.